(12) United States Patent
Shriwas et al.

(10) Patent No.: US 12,111,816 B2
(45) Date of Patent: Oct. 8, 2024

(54) METHOD AND UNIQUENESS CONSTRAINT MANAGEMENT SERVER FOR MANAGING UNIQUENESS CONSTRAINTS ASSOCIATED WITH ENTITIES

(71) Applicant: Rakuten Mobile, Inc., Tokyo (JP)

(72) Inventors: Pawan Shriwas, Indore (IN); Apurva Tripathi, Indore (IN); Ayush Kumar Singh, Indore (IN); Pankaj Pachori, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/924,681

(22) PCT Filed: Aug. 31, 2022

(86) PCT No.: PCT/US2022/042163
§ 371 (c)(1),
(2) Date: Nov. 11, 2022

(87) PCT Pub. No.: WO2024/039382
PCT Pub. Date: Feb. 22, 2024

(65) Prior Publication Data
US 2024/0248889 A1    Jul. 25, 2024

(30) Foreign Application Priority Data
Aug. 17, 2022  (IN) .............................. 202241046731

(51) Int. Cl.
*G06F 16/00*   (2019.01)
*G06F 16/23*   (2019.01)
*G06F 16/901*  (2019.01)

(52) U.S. Cl.
CPC ...... *G06F 16/2365* (2019.01); *G06F 16/9024* (2019.01)

(58) Field of Classification Search
CPC ......................... G06F 16/2365; G06F 16/9024
See application file for complete search history.

(56) References Cited

U.S. PATENT DOCUMENTS

| | | | |
|---|---|---|---|
| 9,946,989 B2* | 4/2018 | Bhola | G06Q 10/107 |
| 2006/0123370 A1* | 6/2006 | Vergara-Escobar | G06F 30/3312 716/108 |
| 2009/0077001 A1* | 3/2009 | Macready | G06N 5/02 706/57 |

* cited by examiner

*Primary Examiner* — Cheryl Lewis
(74) *Attorney, Agent, or Firm* — HAUPTMAN HAM, LLP

(57) ABSTRACT

Embodiment herein provides a method for managing uniqueness constraints associated with entities in a graph database. The method includes receiving a constraint specification of an entity from a constraint management system and receiving a configure operation for maintaining uniqueness requirement in the constraint management system. The method also includes determining a constraint key based on inputs received for maintaining the uniqueness requirement in the constraint management system; and creating a composite unique constraint based on the constraint key. The composite unique constraint comprises properties of the constraint key and a constraint vertex indicating a class of constraints available in the inputs received for maintaining uniqueness requirement. The method also includes storing the composite unique constraint in the constraint specification received from the constraint management system to validate the uniqueness before performing an operation on the entity.

15 Claims, 8 Drawing Sheets

(Conti..)

METHOD AND UNIQUENESS CONSTRAINT MANAGEMENT SERVER FOR MANAGING UNIQUENESS CONSTRAINTS ASSOCIATED WITH ENTITIES

PRIORITY CLAIM AND CROSS-REFERENCE

The present application is a National Phase of International Application No. PCT/US2022/042163, filed Aug. 31, 2022, which claims priority to Indian Application No. 202241046731, filed Aug. 17, 2022. IN Application is hereby incorporated by reference in its entirety.

FIELD OF INVENTION

The present invention relates to inventory management and more specifically related to a method and uniqueness constraint management server for managing uniqueness constraints associated with entities.

BACKGROUND

In general, inventories of large organizations are maintained using graph databases where various entities are created to represent various departments or elements of the large organizations. Each entity created within the graph database includes properties such as a label defined between entities, characteristics of entities, etc. which may be defined on a global graph level and are defined by a user at a time of creation of an entity.

However, there is no check performed to determine if there are any constraints to the uniqueness of the properties of the entity. As a result, an admin or a supervisor will have to specifically look into the properties of the various entities which is a very consuming and cumbersome process. Also, when handling the inventories of the large organizations multiple human resources may have to be deployed to check the fulfillment of the uniqueness of the properties of the various entities which may increase cost of the human resources in the large organizations as the same human resource could be used to perform other tasks. Thus, it is desired to address the aforementioned disadvantages or other shortcomings or at least provide a useful alternative.

OBJECT OF INVENTION

The principal object of the embodiments herein is to provide a method and uniqueness constraint management server for managing uniqueness constraints associated with properties of entities. The proposed method operates at a validation layer of a graph database and hence if the uniqueness constraints are not satisfied then the entities is not created. Therefore, the proposed method helps in saving memory as well as processing capacity of the uniqueness constraint management server without creating the entities when the uniqueness constraints are not satisfied.

SUMMARY

Accordingly, the embodiment herein is to provide a method for managing uniqueness constraints associated with entities in a graph database. The method includes receiving a constraint specification of at least one entity from a constraint management system and receiving, by uniqueness constraint management server, a configure operation for maintaining uniqueness requirement in the constraint management system. The method also includes determining, by the uniqueness constraint management server, at least one constraint key based on inputs received for maintaining the uniqueness requirement in the constraint management system; and creating, by the uniqueness constraint management server, a composite unique constraint based on the at least one constraint key, where the composite unique constraint includes properties of the at least one constraint key and a constraint vertex indicating a class of constraints available in the inputs received for maintaining uniqueness requirement. The method also includes storing, by the uniqueness constraint management server, the composite unique constraint in the constraint specification received from the constraint management system to validate the uniqueness before performing at least one operation on the at least one entity.

In an embodiment, the method includes receiving, by the uniqueness constraint management server, an apply operation to apply the uniqueness requirement on constraints stored at the constraint management system; creating, by the uniqueness constraint management server, at least one object for the constraints stored at the constraint management system; determining, by the uniqueness constraint management server, constrain keys corresponding to the at least one object; determining, by the uniqueness constraint management server, whether the uniqueness constraint management server meets the uniqueness requirement by applying the constraint specification comprising the composite unique constraint on the at least one object; and displaying, by the uniqueness constraint management server, one of: a success message in response to determining the uniqueness requirement is met, and a duplicate or failure message in response to determining the uniqueness requirement is not met.

In an embodiment, the method includes receiving, by the uniqueness constraint management server, an unapply operation to remove the uniqueness requirement from constraints stored at the constraint management system; and removing, by the uniqueness constraint management server, the constrain keys corresponding to the at least one object to remove uniqueness requirement from the constraints stored at the constraint management system.

In an embodiment, the method includes receiving, by the uniqueness constraint management server, an reapply operation to reapply the uniqueness requirement from constraints stored at the constraint management system; removing, by the uniqueness constraint management server, values corresponding to the constrain keys corresponding to the at least one object to remove uniqueness requirement from the constraints stored at the constraint management system; and performing, by the uniqueness constraint management server, the apply operation.

In an embodiment, the method includes receiving, by uniqueness constraint management server, an unconfigure operation to delete the at least one constraint key; and deleting, by the uniqueness constraint management server, the at least one constraint key from the composite unique constraint.

Accordingly, the embodiments herein provide a uniqueness constraint management server for managing uniqueness constraints associated with entities in a graph database. The uniqueness constraint management server includes a memory; a processor; and a uniqueness constraint management controller, communicatively coupled to the memory and the processor, and configured to: receive a constraint specification of at least one entity from a constraint management system and receive a configure operation for maintaining uniqueness requirement in the constraint management system. The uniqueness constraint management controller is also configured to determine at least one constraint key based on inputs received for maintaining the uniqueness requirement in the constraint management system; and create a composite unique constraint based on the at least one constraint key, where the composite unique constraint includes properties of the at least one constraint key and a constraint vertex indicating a class of constraints available in the inputs received for maintaining uniqueness requirement. The uniqueness constraint management controller is also configured to store the composite unique constraint in the constraint specification received from the constraint management system to validate the uniqueness before performing at least one operation on the at least one entity.

Accordingly, the embodiments herein provide a computer program product (CPP) for managing uniqueness constraints associated with entities in a graph database. The CPP includes a computer executable program code recorded on a computer readable non-transitory storage medium, where said computer executable program code when executed causing the actions including receiving a constraint specification of at least one entity from a constraint management system; receiving a configure operation for maintaining uniqueness requirement in the constraint management system; determining at least one constraint key based on inputs received for maintaining the uniqueness requirement in the constraint management system; creating a composite unique constraint based on the at least one constraint key, where the composite unique constraint includes properties of the at least one constraint key and a constraint vertex indicating a class of constraints available in the inputs received for maintaining uniqueness requirement; and storing the composite unique constraint in the constraint specification received from the constraint management system to validate the uniqueness before performing at least one operation on the at least one entity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
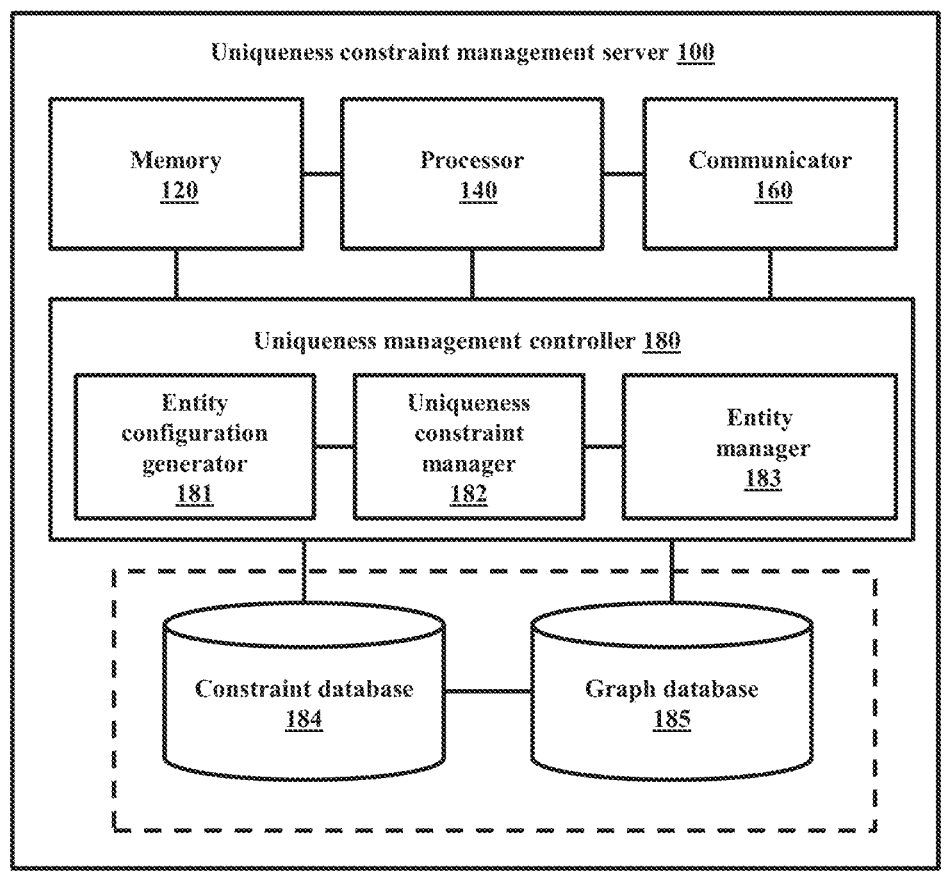
FIG. 1 is a block diagram of a uniqueness constraint management server for managing uniqueness constraints associated with entities in a graph database, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As it is traditional in the field, the embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a method for managing uniqueness constraints associated with entities in a graph database. The method includes receiving a constraint specification of at least one entity from a constraint management system and receiving, by uniqueness constraint management server, a configure operation for maintaining uniqueness requirement in the constraint management system. The method also includes determining, by the uniqueness constraint management server, at least one constraint key based on inputs received for maintaining the uniqueness requirement in the constraint management system; and creating, by the uniqueness constraint management server, a composite unique constraint based on the at least one constraint key, where the composite unique constraint includes properties of the at least one constraint key and a constraint vertex indicating a class of constraints available in the inputs received for maintaining uniqueness requirement. The method also includes storing, by the uniqueness constraint management server, the composite unique constraint in the constraint specification received from the constraint management system to validate the uniqueness before performing at least one operation on the at least one entity.

Accordingly, the embodiments herein provide a uniqueness constraint management server for managing uniqueness constraints associated with entities in a graph database. The uniqueness constraint management server includes a memory; a processor; and a uniqueness constraint management controller, communicatively coupled to the memory and the processor, and configured to: receive a constraint specification of at least one entity from a constraint management system and receive a configure operation for maintaining uniqueness requirement in the constraint management system. The uniqueness constraint management controller is also configured to determine at least one constraint key based on inputs received for maintaining the uniqueness requirement in the constraint management system; and create a composite unique constraint based on the at least one constraint key, where the composite unique constraint includes properties of the at least one constraint key and a constraint vertex indicating a class of constraints available in the inputs received for maintaining uniqueness requirement. The uniqueness constraint management controller is also configured to store the composite unique constraint in the constraint specification received from the constraint management system to validate the uniqueness before performing at least one operation on the at least one entity.

Accordingly, the embodiments herein provide a computer program product (CPP) for managing uniqueness constraints associated with entities in a graph database. The CPP includes a computer executable program code recorded on a computer readable non-transitory storage medium, where said computer executable program code when executed causing the actions including receiving a constraint specification of at least one entity from a constraint management system; receiving a configure operation for maintaining uniqueness requirement in the constraint management system; determining at least one constraint key based on inputs received for maintaining the uniqueness requirement in the constraint management system; creating a composite unique constraint based on the at least one constraint key, where the composite unique constraint includes properties of the at least one constraint key and a constraint vertex indicating a class of constraints available in the inputs received for maintaining uniqueness requirement; and storing the composite unique constraint in the constraint specification received from the constraint management system to validate the uniqueness before performing at least one operation on the at least one entity.

In the conventional graph database such as for example, janusgraph database uniqueness constraints are provided on a global graph level for a particular edge label or type. However, the uniqueness constraints provided at the global graph level restricts defining same edge label or type on a smaller scope based on user requirement. Unlike the conventional graph database, the proposed method provides more flexibility in the graph database by building a custom layer on the top of the janusgraph to allow the same edge label or type based on user requirement by defining the uniqueness constraint not at the global graph level.

Referring now to the drawings and more particularly to FIGS. 1 through 7, where similar reference characters denote corresponding features consistently throughout the figures, there are shown preferred embodiments.

FIG. 1 is a block diagram of a uniqueness constraint management server (100) for managing uniqueness constraints associated with entities in a graph database (185), according to an embodiment as disclosed herein.

Referring to the FIG. 1, in an embodiment, the uniqueness constraint management server (100) includes a memory (120), a processor (140), a communicator (160) and a uniqueness management controller (180). The uniqueness constraint management server (100) operates in a validation layer of the graph database (185).

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160), and the uniqueness management controller (180). The processor (140) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the uniqueness constraint management server (100) and with external devices via one or more networks.

In an embodiment, the uniqueness management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The uniqueness management controller (180) includes an entity configuration generator (181), a uniqueness constraint manager (182), an entity manager (183), a constraint database (184), and the graph database (185).

In an embodiment, the entity configuration generator (181) is configured to receive a request for creation of an entity in the graph database (185) and generate an entity configuration file based on information of the entity. The entity can be for example, students and colleges in a graph associated with academic; various departments of government in a graph associated with government organization, etc. The request includes information of the entity such as for example but not limited to type of entity, properties of the entity, etc. The entity configuration file includes the uniqueness constraints relevant for the entity out of multiple uniqueness constraints, to be applied while performing the operation. Each uniqueness constraint of the multiple constrains includes a uniqueness constraint type, a uniqueness constraint scope, a uniqueness constraint scope field, and a uniqueness constraint field.

In an embodiment, the uniqueness constraint manager (182) is configured to receive a constraint specification of the entity. The uniqueness constraint manager (182) is also configured to receive a configure operation for maintaining uniqueness requirement in the constraint management system. The uniqueness constraint manager (182) is also configured to determine a constraint key based on inputs received for maintaining the uniqueness requirement in the constraint management system. The uniqueness constraint manager (182) is further configured to create a composite unique constraint based on the constraint key. In one embodiment, the composite unique constraint comprises properties of the constraint key and a constraint vertex indicating a class of constraints available in the inputs received for maintaining uniqueness requirement. The uniqueness constraint manager (182) is further configured to store the composite unique constraint in the constraint specification received from the constraint management system to validate the uniqueness before performing at least one operation on the at least one entity.

In one embodiment, the uniqueness constraint manager (182) is configured to receive an apply operation to apply the uniqueness requirement on constraints stored at the constraint management system and create object for the constraints stored at the constraint management system. The uniqueness constraint manager (182) is configured to determine constrain keys corresponding to the object and determine whether the uniqueness constraint management server meets the uniqueness requirement by applying the constraint specification comprising the composite unique constraint on the object. The uniqueness constraint manager (182) is also configured to enable displaying one of: a success message in response to determining the uniqueness requirement is met, and a duplicate or failure message in response to determining the uniqueness requirement is not met.

In one embodiment, the uniqueness constraint manager (182) is configured to receive an unapply operation to remove the uniqueness requirement from constraints stored at the constraint management system and remove the constrain keys corresponding to the object to remove uniqueness requirement from the constraints stored at the constraint management system.

In one embodiment, the uniqueness constraint manager (182) is configured to receive an reapply operation to reapply the uniqueness requirement from constraints stored at the constraint management system and remove values corresponding to the constrain keys corresponding to the at least one object to remove uniqueness requirement from the constraints stored at the constraint management system; and perform the apply operation.

In one embodiment, the uniqueness constraint manager (182) is configured to receive an unconfigure operation to delete the constraint key and delete the at least one constraint key from the composite unique constraint.

In an embodiment, the entity manager (183) is configured to create the entity based on inputs received to perform one or more operation. In one embodiment, the one or more operations can be configure apply, unapply, reapply, unconfigure operations. The entity manager (183) is also configured to display either a success message or an error message indicating that the entity cannot be created.

In an embodiment, the constraint database (184) is configured to store actual configuration of each of the multiple uniqueness constraints.

In an embodiment, the graph database (185) is configured to store the entities as and when the entities are created. In an embodiment, the constraint database (184) and the graph database (185) may be separate elements located within the uniqueness constraint management server (100). In another embodiment, the constraint database (184) and the graph database (185) may be a single element located within the uniqueness constraint management server (100). The constraint(s) database (184) and the graph database (185) may be located within the memory (120) or out of the memory (120) of the uniqueness constraint management server (100).

At least one of the plurality of modules/components of the uniqueness management controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Although the FIG. 1 shows various hardware components of the uniqueness constraint management server (100), but it is to be understood that other embodiments are not limited thereon. In other embodiments, the uniqueness constraint management server (100) may include less or a greater number of components. Further, the labels or names of the components are used only for illustrative purpose and does not limit the scope of the invention. One or more components can be combined to perform same or substantially similar function to manage the uniqueness constraints associated with the entities in the graph database (185).

Figure 2:
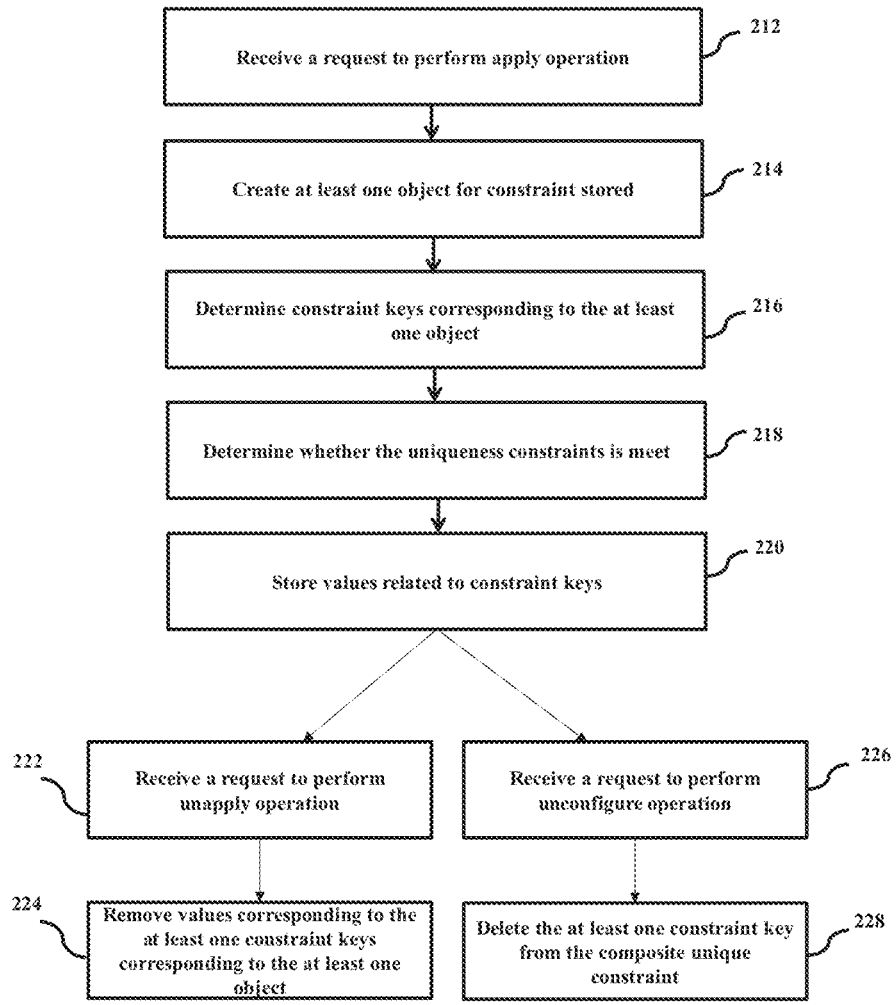
FIG. 2 is a flow chart illustrating a method for managing uniqueness constraints associated with entities in the graph database, according to an embodiment as disclosed herein.
Figure 2:
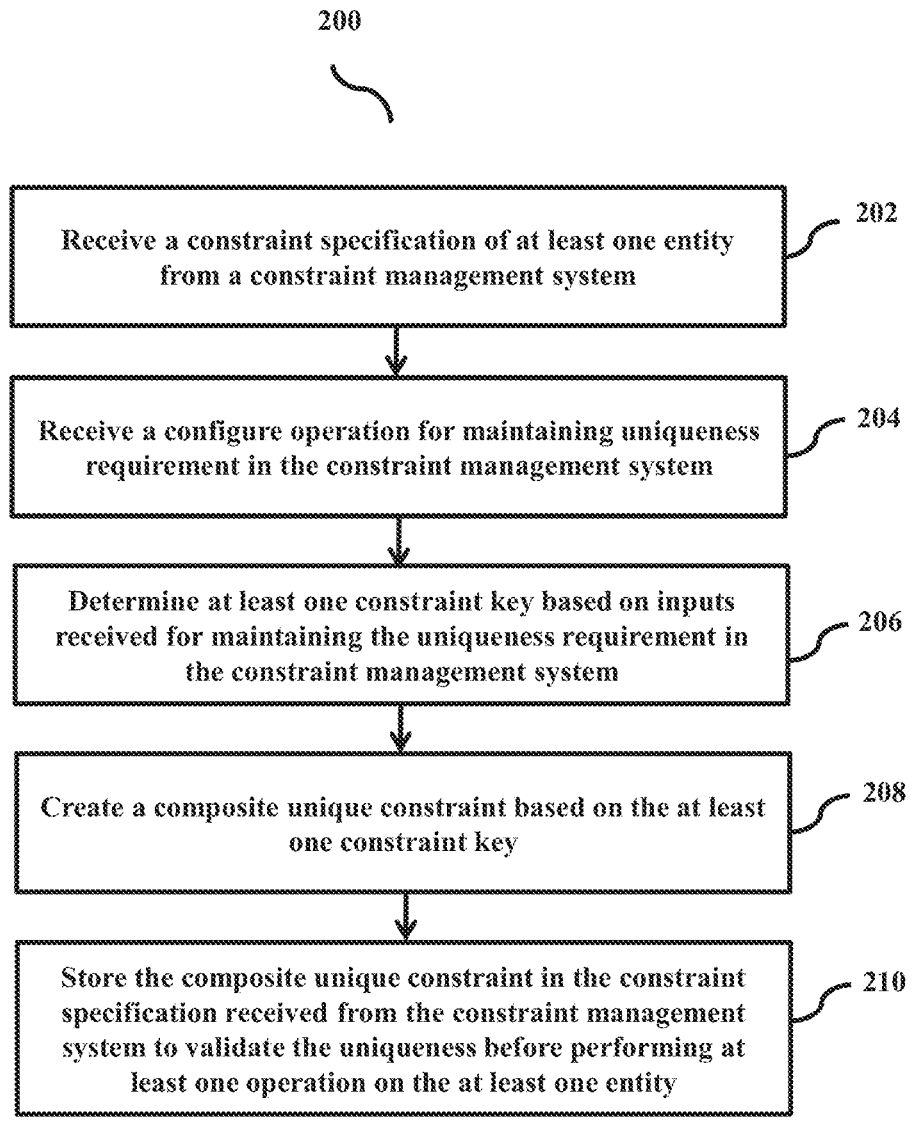

FIG. 2 is a flow chart (200) illustrating a method for managing the uniqueness constraints associated with the entities in the graph database (185), according to an embodiment as disclosed herein.

Referring to the FIG. 2, at step 202, the method includes the uniqueness constraint management server (100) receiving the constraint specification of the at least one entity from the constraint management system.

At step 204, the method includes the uniqueness constraint management server (100) receive the configure operation for maintaining uniqueness requirement. In one embodiment, the uniqueness constraint management server (100) is configured to receive the configure operation through inputs received from the user device.

At step 206, the method includes the uniqueness constraint management server (100) determines the constraint key based on the inputs received for maintaining the uniqueness requirements.

At step 208, the method includes the uniqueness constraint management server (100) creates the composite unique constraint based on the constraint key.

At step 210, the method includes the uniqueness constraint management server (100) stores the composite unique constraint in the constraint specification received from the constraint management system to validate the uniqueness before performing the at least operation on the at least one entity.

At step 212, the method includes the uniqueness constraint management server (100) receives the request to perform the apply operation. In one embodiment, the uniqueness constraint management server (100) is configured to receive the apply operation after the configure operation is successfully performed.

At step 214, the method includes the uniqueness constraint management server (100) creates the at least one object for the constraint stored. In one embodiment, the constraints are stored in the constraint specification.

At step 216, the method includes the uniqueness constraint management server (100) determine the constraint keys corresponding to the object.

At step 218, the method includes the uniqueness constraint management server (100) determine whether the uniqueness constraints is met.

At step 220, the method includes the uniqueness constraint management server (100) stores values related to the constraint keys.

At step 222, the method includes the uniqueness constraint management server (100) receives the request to perform the unapply operation.

At step 224, the method includes the uniqueness constraint management server (100) removes the values corresponding to the constraint keys corresponding to the at least one object.

At step 226, the method includes the uniqueness constraint management server (100) receives the request to perform the delete operation.

At step 228, the method includes the uniqueness constraint management server (100) deletes the constraint key from the composite constraint key.

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 3:
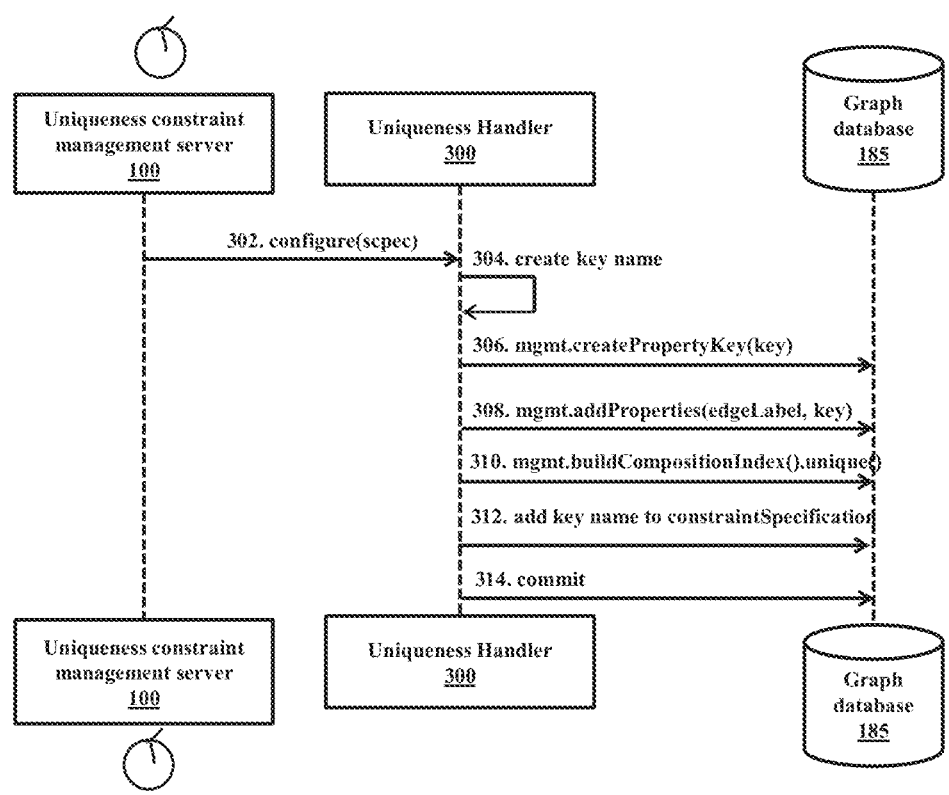
FIG. 3 illustrates step-by-step process for the creation of the uniqueness constraint key in the graph database, according to an embodiment as disclosed herein.

FIG. 3 illustrates step-by-step process for the creation of the uniqueness constraint key in the graph database (185), according to an embodiment as disclosed herein.

The uniqueness constraint management server (100) implements a standard interface which is invoked by the constraint framework. At step 302, the uniqueness constraint management server (100) sends a configure (scpec) command to a uniqueness handler (300) to load the specification and apply the specification from the graph database (185). At step 304, the uniqueness handler (300) creates the uniqueness constraint key name.

Further, at step 306, the uniqueness constraint handler (300) sends mgmt.createPropertyKey(key) command to the graph database (185) to create the uniqueness constraint key and at step 308 the uniqueness constraint handler (300) sends mgmt.addProperties(edgeLabel, key) command to the graph database (185) to bind the created property to the edge that is being controlled along with the uniqueness constraint key. Similarly, at step 310 the uniqueness constraint handler (300) sends mgmt.buildCompositionIndex( ).unique( ), at step 312 the uniqueness constraint handler (300) adds the uniqueness constraint key name to constraintSpecification to the graph database (185). At step 314, the uniqueness constraint handler (300) sends a commit command to end the flow which creates the uniqueness constraint key FIG. 4 illustrates step-by-step process for application of the uniqueness constraint in the graph database (185), according to an embodiment as disclosed herein.

Figure 4:
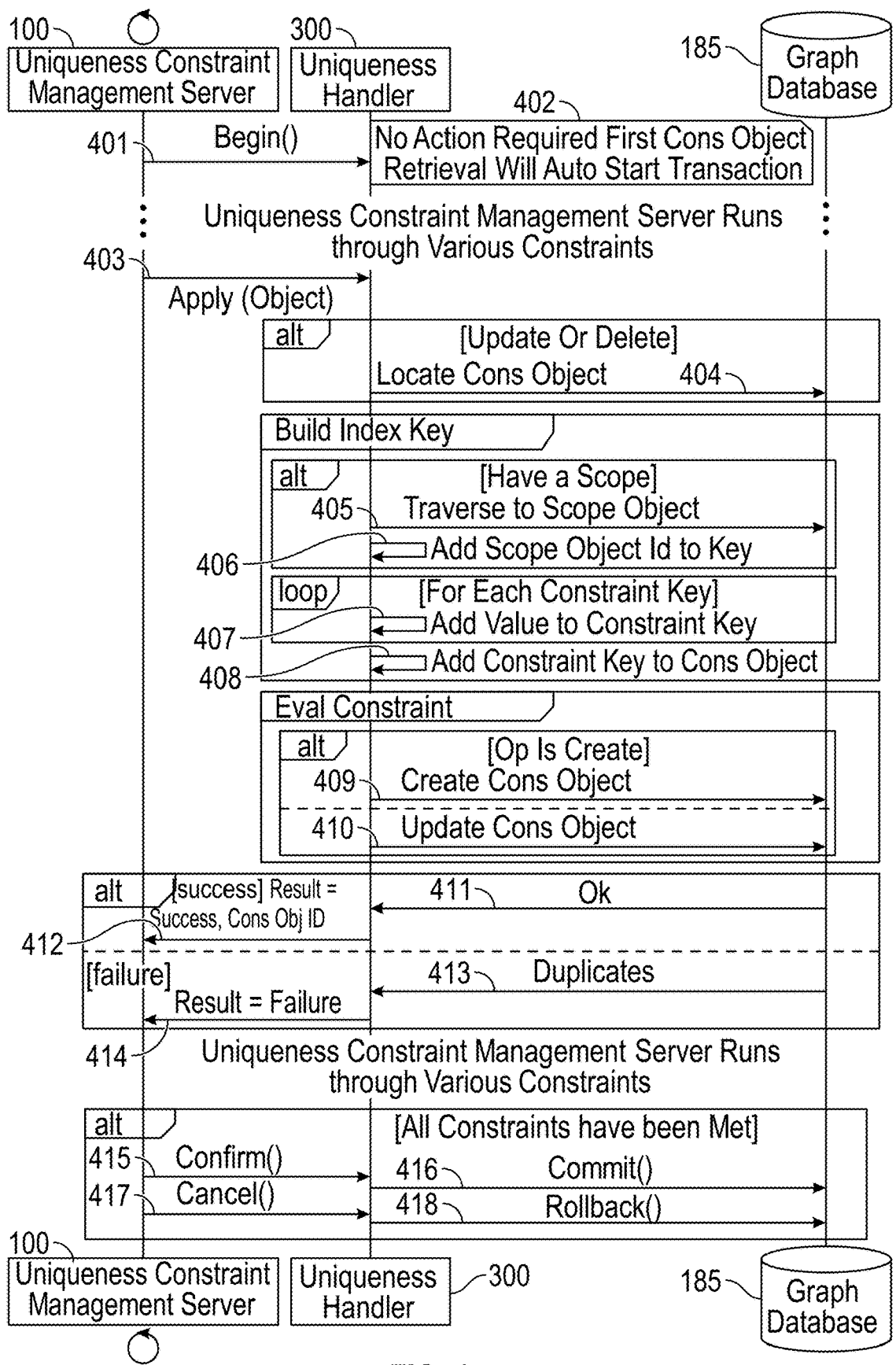
FIG. 4 illustrates step-by-step process for application of the uniqueness constraint in the graph database, according to an embodiment as disclosed herein.

Referring to the FIG. 4, at 401, the uniqueness constraint management server (100) sends a begin ( ) command to the uniqueness constraint handler (300). On receiving the begin ( ) command, at 402, no action is required and first cons object retrieval will auto start transaction at the graph database (185) and the uniqueness constraint management server (100) runs through various uniqueness constraints and at 403, the uniqueness constraint management server (100) sends an apply(object) command to the uniqueness constraint handler (300).

At 404, the uniqueness handler (300) sends a command to the graph database (185) to locate the edge where the generated uniqueness constraint key needs to be created. In one embodiment, the uniqueness constraint handler (300) creates at least one object for the constraints stored based on the located edge.

At 404, the uniqueness handler (300) sends a command to the graph database (185) to traverse to object if the traverse is present.

At 405, the uniqueness handler (300) adds the object ID to the constraint key and at 406, the uniqueness handler (300) adds value to the constraint key.

At 407, the uniqueness handler (300) adds constraint key to constraint object and at 408, the uniqueness handler (300) creates constraint object.

At 409, the uniqueness handler (300) updates the constraint object. The uniqueness constraint management server (100) then determines the success or failure of the validation between steps 411 and 414.

Further, the uniqueness constraint management server (100) ensures that all constraints have been met by sending various commands between step 415 and step 418.

Figure 5:
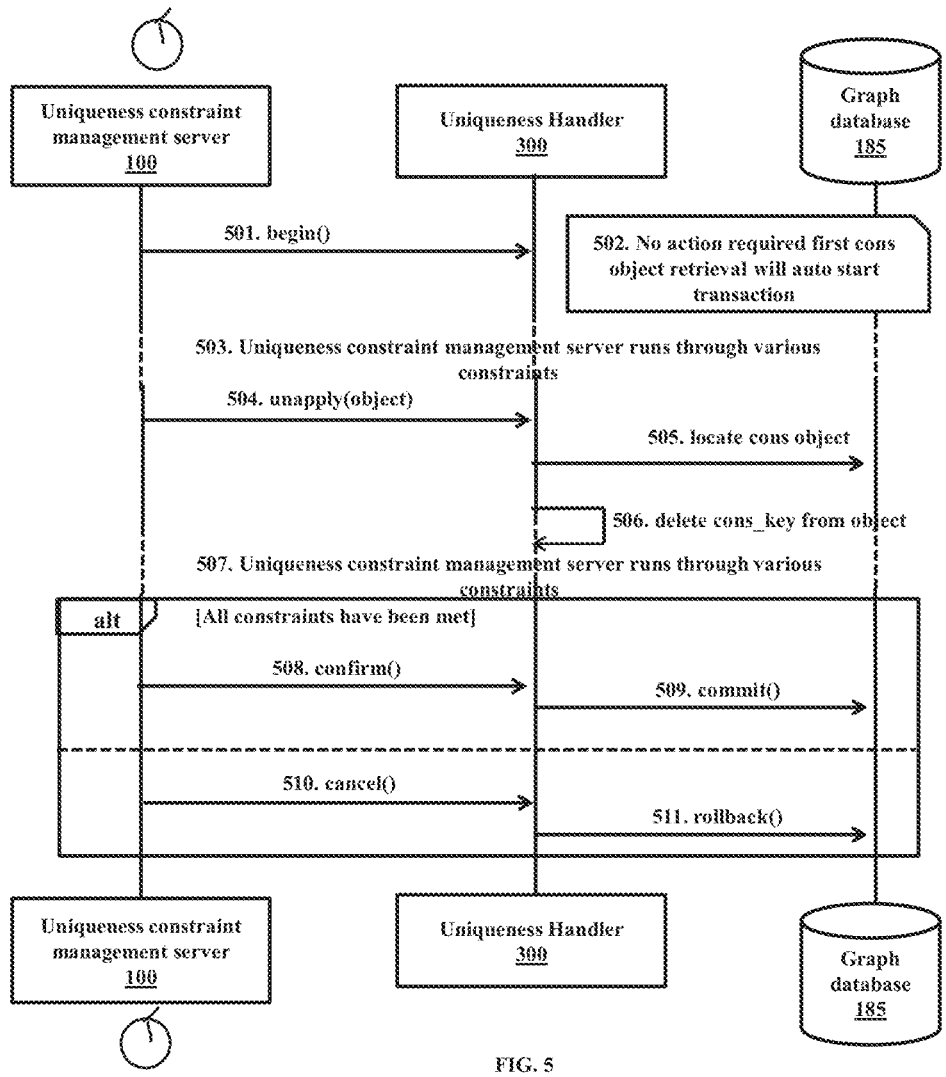
FIG. 5 illustrates step-by-step process for deleting the uniqueness constraints and the generated uniqueness constraint keys associated with the uniqueness constraints, according to an embodiment as disclosed herein.

FIG. 5 illustrates step-by-step process for deleting the uniqueness constraints and the uniqueness constraint keys associated with the uniqueness constraints, according to an embodiment as disclosed herein.

Referring to the FIG. 5, the process of the deletion of the uniqueness constraint and henceforth the removal of the generated uniqueness constraint key is provided. The process is executed based on a user requirement i.e., in case the user wants to delete the uniqueness constraint then the proposed process is executed.

At step 501, the uniqueness constraint management server (100) sends the begin ( ) command to the uniqueness handler (300). On receiving the begin ( ) command, at step 502, no action is required and first cons object retrieval will auto start transaction at the graph database (185). At step 503, the uniqueness constraint management server (100) runs through various uniqueness constraints and at step 504, the uniqueness constraint management server (100) sends an unapply (object) command to the uniqueness handler (300). At step 505, the uniqueness handler (300) sends a command to the graph database (185) to locate the edge where the generated uniqueness constraint key needs to be deleted.

At step 506, the uniqueness handler (300) sends delete cons_key edge command to itself to delete the uniqueness constraint key at the edge. In response, at step 507, the uniqueness constraint management server (100) runs through various uniqueness constraints in the graph database (185). Further, the uniqueness constraint management server (100) ensures that all constraints have been met by sending various commands between step 508 and step 511.

Therefore, the operation unapply( ) is used to clean up the uniqueness constraint keys from the uniqueness constraint management server (100). The uniqueness constraint keys are stored on the edge and hence the use of the operation unapply( ) is redundant if invoked before deleting the uniqueness.

Figure 6:
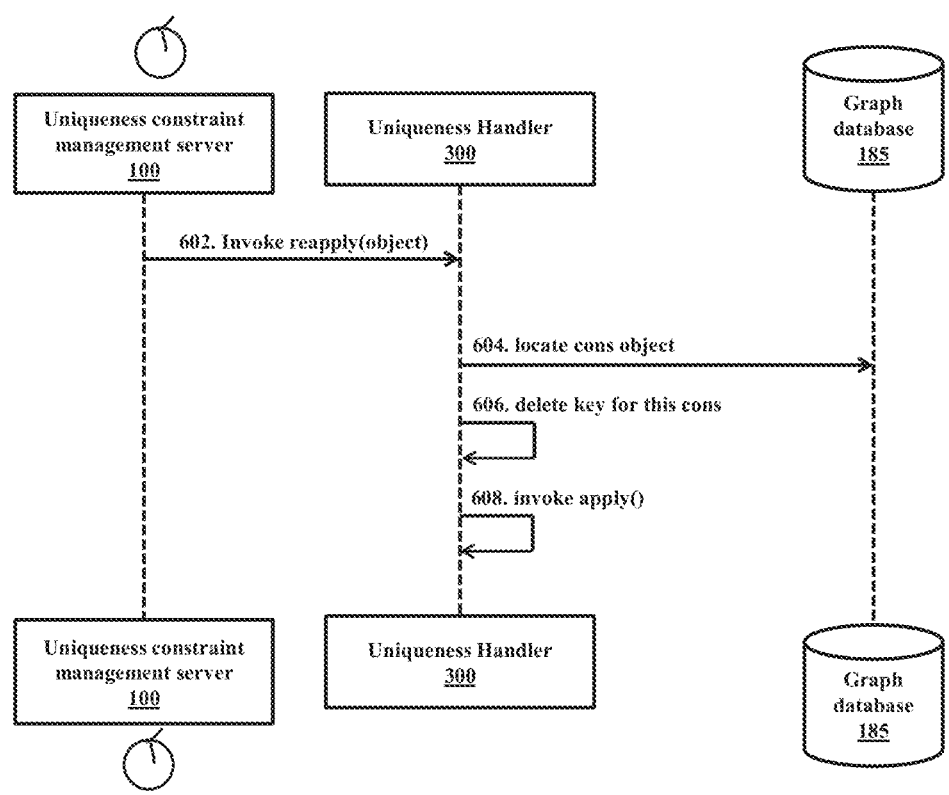
FIG. 6 illustrates step-by-step process for reapplying the uniqueness constraints, according to an embodiment as disclosed herein.

FIG. 6 illustrates step-by-step process for reapplying uniqueness constraints, according to an embodiment as disclosed herein.

Another operation which can be used by the uniqueness constraint management server (100) is reapply ( ) operation. The reapply operation clears the existing uniqueness constraint key and invokes apply operation to create a new uniqueness constraint key. As shown in FIG. 6, at step 602, the uniqueness constraint management server (100) sends a reapply (object) command to the uniqueness handler (300). At step 604, the uniqueness handler (300) sends a command to the graph database (185) to locate the edge where the generated uniqueness constraint key needs to be deleted.

At step 606, the uniqueness handler (300) sends delete cons_key edge command to itself to delete the uniqueness constraint key at the edge.

At step 608, the uniqueness constraint management server (100) sends an apply (object) command to the uniqueness handler (300) similar to step 403 of FIG. 4.

Figure 7:
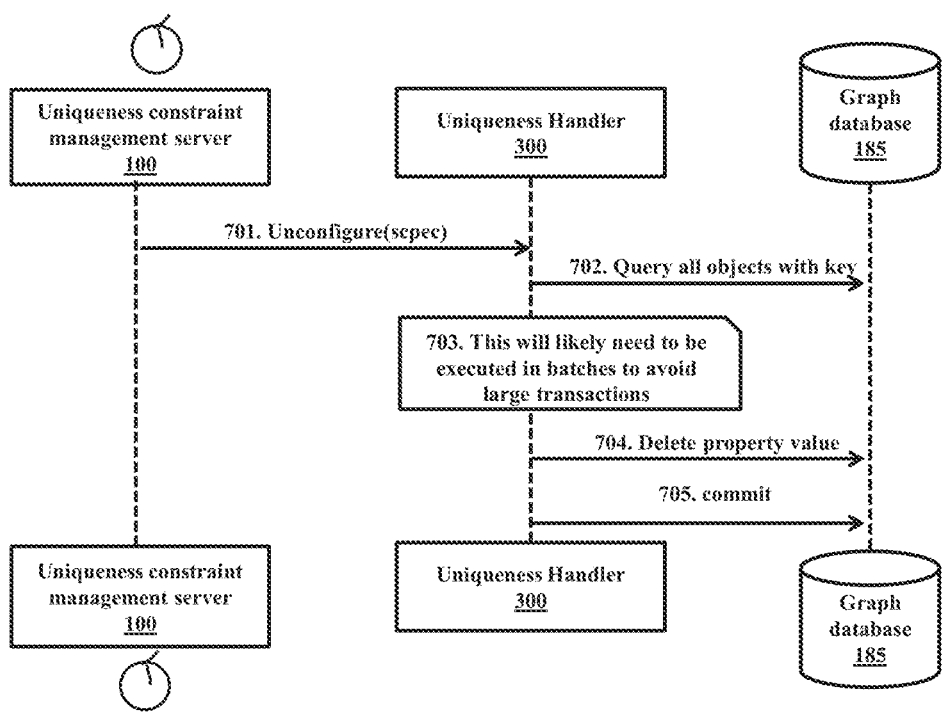
FIG. 7 illustrates step-by-step process for deleting the uniqueness constraints from all objects, according to an embodiment as disclosed herein.

FIG. 7 illustrates step-by-step process for deleting the uniqueness constraints from all objects, according to an embodiment as disclosed herein.

The graph database (185) generally does not allow a property key to be deleted. Hence, an unconfigure( ) operation is used to delete all existing uniqueness constraint key values that the graph database (185) owns. Therefore, the entire uniqueness constraints are deleted. The entities or the objects, on which the uniqueness constraint keys are applied, are selected and the uniqueness constraint is deleted from all the entities or the objects.

Referring to the FIG. 7, at step 701, the uniqueness constraint management server (100) sends the unconfigure (scpec) to a uniqueness handler (300) to delete the specification related to the uniqueness constraints from all the objects. At step 702, the uniqueness handler (300) queries all the objects in the graph database (185) with the uniqueness constraint key. At step 703, the uniqueness handler (300) executes the unconfigure (scpec) operation based on all the specifications of the uniqueness constraint stored in the graph database (185) by the query in batches to avoid large transactions simultaneously. Further, at step 704, the uniqueness handler (300) sends a delete property value to the graph database (185) and at step 705, the uniqueness handler (300) sends a commit command to the graph database (185) which deletes all the existing properties key values that the graph database (185) owns.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for managing uniqueness constraints associated with entities in a graph database, wherein the method comprises:
    receiving, by a uniqueness constraint management server, a constraint specification of at least one entity from a constraint management system;
    receiving, by uniqueness constraint management server, a configure operation for maintaining uniqueness requirement in the constraint management system;
    determining, by the uniqueness constraint management server, at least one constraint key based on inputs received for maintaining the uniqueness requirement in the constraint management system;
    creating, by the uniqueness constraint management server, a composite unique constraint based on the at least one constraint key, wherein the composite unique constraint comprises properties of the at least one constraint key and a constraint vertex indicating a class of constraints available in the inputs received for maintaining uniqueness requirement; and
    storing, by the uniqueness constraint management server, the composite unique constraint in the constraint specification received from the constraint management system to validate the uniqueness before performing at least one operation on the at least one entity.

2. The method as claimed in claim 1, wherein the method comprises:
    receiving, by the uniqueness constraint management server, an apply operation to apply the uniqueness requirement on constraints stored at the constraint management system;
    creating, by the uniqueness constraint management server, at least one object for the constraints stored at the constraint management system;
    determining, by the uniqueness constraint management server, constrain keys corresponding to the at least one object;
    determining, by the uniqueness constraint management server, whether the uniqueness constraint management server meets the uniqueness requirement by applying the constraint specification comprising the composite unique constraint on the at least one object; and
    displaying, by the uniqueness constraint management server, one of: a success message in response to determining the uniqueness requirement is met, and a duplicate or failure message in response to determining the uniqueness requirement is not met.

3. The method as claimed in claim 2, wherein the method comprises:
    receiving, by the uniqueness constraint management server, an unapply operation to remove the uniqueness requirement from constraints stored at the constraint management system; and
    removing, by the uniqueness constraint management server, the constrain keys corresponding to the at least one object to remove uniqueness requirement from the constraints stored at the constraint management system.

4. The method as claimed in claim 2, wherein the method comprises:
receiving, by the uniqueness constraint management server, an reapply operation to reapply the uniqueness requirement from constraints stored at the constraint management system;
removing, by the uniqueness constraint management server, values corresponding to the constrain keys corresponding to the at least one object to remove uniqueness requirement from the constraints stored at the constraint management system; and
performing, by the uniqueness constraint management server, the apply operation.

5. The method as claimed in claim 1, wherein the method comprises:
receiving, by uniqueness constraint management server, an unconfigure operation to delete the at least one constraint key; and
deleting, by the uniqueness constraint management server, the at least one constraint key from the composite unique constraint.

6. An uniqueness constraint management server for managing uniqueness constraints associated with entities in a graph database, wherein the uniqueness constraint management server comprises:
a memory;
a processor coupled to the memory;
a communicator coupled to the memory and the processor; and
a uniqueness constraint management controller, communicatively coupled to the memory and the processor, configured to:
receive a constraint specification of at least one entity from a constraint management system;
receive a configure operation for maintaining uniqueness requirement in the constraint management system;
determine at least one constraint key based on inputs received for maintaining the uniqueness requirement in the constraint management system;
create a composite unique constraint based on the at least one constraint key, wherein the composite unique constraint comprises properties of the at least one constraint key and a constraint vertex indicating a class of constraints available in the inputs received for maintaining uniqueness requirement; and
store the composite unique constraint in the constraint specification received from the constraint management system to validate the uniqueness before performing at least one operation on the at least one entity.

7. The uniqueness constraint management server as claimed in claim 6, wherein the uniqueness constraint management controller is configured to:
receive an apply operation to apply the uniqueness requirement on constraints stored at the constraint management system;
create at least one object for the constraints stored at the constraint management system;
determine constrain keys corresponding to the at least one object;
determine whether the uniqueness constraint management server meets the uniqueness requirement by applying the constraint specification comprising the composite unique constraint on the at least one object; and
display one of: a success message in response to determining the uniqueness requirement is met, and a duplicate or failure message in response to determining the uniqueness requirement is not met.

8. The uniqueness constraint management server as claimed in claim 7, wherein the uniqueness constraint management controller is configured to:
receive an unapply operation to remove the uniqueness requirement from constraints stored at the constraint management system; and
remove the constrain keys corresponding to the at least one object to remove uniqueness requirement from the constraints stored at the constraint management system.

9. The uniqueness constraint management server as claimed in claim 7, wherein the uniqueness constraint management controller is configured to:
receive an reapply operation to reapply the uniqueness requirement from constraints stored at the constraint management system;
remove values corresponding to the constrain keys corresponding to the at least one object to remove uniqueness requirement from the constraints stored at the constraint management system; and
perform the apply operation.

10. The uniqueness constraint management server as claimed in claim 6, wherein the uniqueness constraint management controller is configured to:
receive an unconfigure operation to delete the at least one constraint key; and
delete the at least one constraint key from the composite unique constraint.

11. A computer program product (CPP) for managing uniqueness constraints associated with entities in a graph database, wherein the CPP comprises:
a computer executable program code recorded on a computer readable non-transitory storage medium, wherein said computer executable program code when executed causing the actions including:
receiving a constraint specification of at least one entity from a constraint management system;
receiving a configure operation for maintaining uniqueness requirement in the constraint management system;
determining at least one constraint key based on inputs received for maintaining the uniqueness requirement in the constraint management system;
creating a composite unique constraint based on the at least one constraint key, wherein the composite unique constraint comprises properties of the at least one constraint key and a constraint vertex indicating a class of constraints available in the inputs received for maintaining uniqueness requirement; and
storing the composite unique constraint in the constraint specification received from the constraint management system to validate the uniqueness before performing at least one operation on the at least one entity.

12. The CPP as claimed in claim 11, further comprises:
receiving an apply operation to apply the uniqueness requirement on constraints stored at the constraint management system;
creating at least one object for the constraints stored at the constraint management system;
determining constrain keys corresponding to the at least one object;
determining whether the uniqueness constraint management server meets the uniqueness requirement by applying the constraint specification comprising the composite unique constraint on the at least one object; and displaying one of: a success message in response to determining the uniqueness requirement is met, and a duplicate or failure message in response to determining the uniqueness requirement is not met.

13. The CPP as claimed in claim 12, further comprises:

receiving an unapply operation to remove the uniqueness requirement from constraints stored at the constraint management system; and removing the constrain keys corresponding to the at least one object to remove uniqueness requirement from the constraints stored at the constraint management system.

14. The CPP as claimed in claim 12, further comprises:

receiving an reapply operation to reapply the uniqueness requirement from constraints stored at the constraint management system;

removing values corresponding to the constrain keys corresponding to the at least one object to remove uniqueness requirement from the constraints stored at the constraint management system; and performing the apply operation.

15. The CPP as claimed in claim 11, further comprises:

receiving an unconfigure operation to delete the at least one constraint key; and deleting the at least one constraint key from the composite unique constraint.

* * * * *